United States Patent [19]

Fitzgerald

[11] Patent Number: 5,113,428
[45] Date of Patent: May 12, 1992

[54] CORDLESS TELEPHONE HEADSET

[76] Inventor: Robert Fitzgerald, 12055 B. E. 49th Ave., Denver, Colo. 80239

[21] Appl. No.: 578,884

[22] Filed: Sep. 4, 1990

[51] Int. Cl.⁵ .................. H04M 11/00; H04B 1/38
[52] U.S. Cl. ........................... 379/61; 379/430; 455/90; D14/138; D14/150
[58] Field of Search .............. 381/183; 379/61, 430; 455/89, 90, 100, 351; D14/137, 138, 140, 142, 149, 150

[56] References Cited

U.S. PATENT DOCUMENTS

| | | | |
|---|---|---|---|
| 4,484,029 | 11/1984 | Kenney | 379/61 |
| 4,491,699 | 1/1985 | Walker | 379/430 |
| 4,620,068 | 10/1986 | Wieder | 379/430 |
| 4,741,030 | 5/1988 | Wilson | 379/368 |
| 4,782,527 | 11/1988 | Williamson | 379/430 |
| 4,882,745 | 11/1989 | Silver | 379/61 |
| 4,930,148 | 5/1990 | Lee | 455/90 |

Primary Examiner—James L. Dwyer
Assistant Examiner—Dwayne D. Bost
Attorney, Agent, or Firm—Beaton & Swanson

[57] ABSTRACT

A cordless telephone is disclosed in which the portable unit is totally contained in a headset. The headset includes its own push button key pad and related control buttons, a rechargeable battery and an RF transceiver. In addition, the preferred embodiment of the portable unit has two earphones and a volume control for enhanced and realistic binaural sound and for reducing background noise interference, a microphone flexibly mounted to the headset, and a supplementary head strap for helping to secure the unit to the user's head.

1 Claim, 2 Drawing Sheets

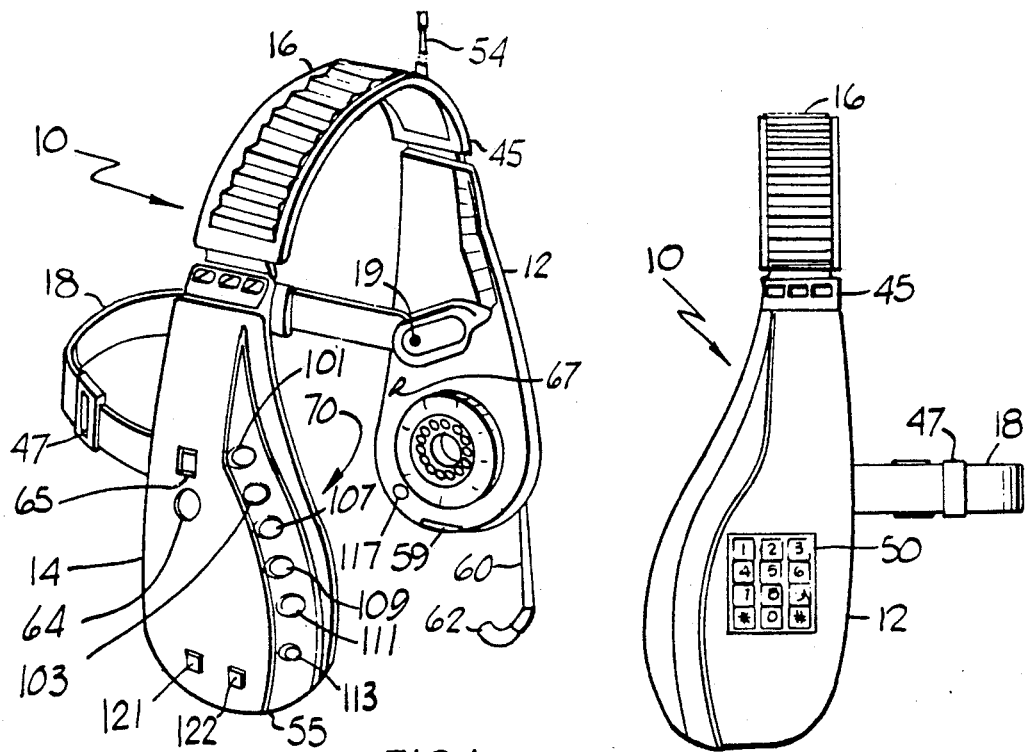
FIG.1
FIG.2
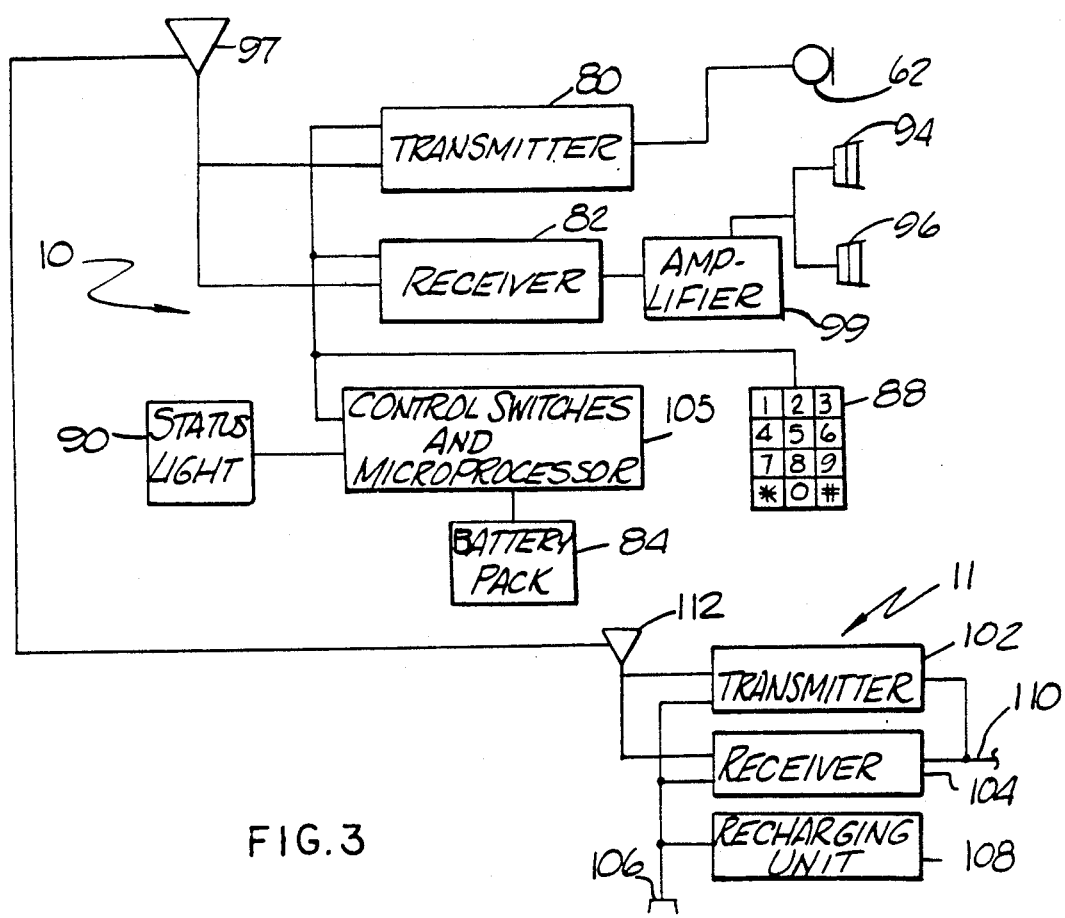
FIG.3

CORDLESS TELEPHONE HEADSET

BACKGROUND OF THE INVENTION

Cordless telephones have been in existence for some time. Cordless telephones operate utilizing a portable telephone unit in communication with a base station through a pair of RF transceivers in the portable unit and in the base station. When the device is operating, dial tone signals and voice signals are transmitted from the RF transmitter in the portable unit to the RF receiver in the base unit, and then over telephone lines in the ordinary manner. Signals received by the base station over the telephone lines are transmitted by the RF transmitter in the base unit to the RF receiver in the portable unit.

Cordless telephones are convenient in that they allow telephone communication without the burden of a cord. However, cordless telephones, like conventional corded telephones, currently require one hand to hold them in an operating position. Therefore, the user is freed from the cord but still must use one hand which otherwise could be used for operating a computer, filing, writing, household chores, sports activities or other activities. Finally, cordless telephones often suffer from poor reception, interference and poor transmitting quality as a result of poor signal to noise ratios in the RF transmissions between the portable unit and the base unit. This poor transmission quality is particularly detrimental when it is considered that the portable unit is intended for use in areas which could have high background noise such as, for example, out of doors, roadside backyards, busy kitchens where a meal is being prepared, laundry rooms where laundry machines are operating and warehouses and other industrial areas.

A device is needed that would include the convenient cordless feature of existing cordless telephones, but would also address the drawbacks of existing cordless telephones. It would be desirable for such a device to have good transmission quality, to shield at least some of the background noise, to be relatively lightweight and streamlined, and to be usable hands-free. Preferably, such a device would be snug-fitting, comfortable and light-weight and would not easily slip from the operating position while the user is moving about.

Other devices in the prior art have attempted to address some but not all of these problems with limited success. In U.S. Pat. No. 4,882,745 by Silver, a "cordless headset telephone" is described in which the portable unit is contained in an element that attaches to the user's head for hands-free operation. However, the Silver device includes only a single earphone to cover one ear while leaving the other ear open and does not have a means to increase the audio amplification over high background noise. This permits a high degree of interfering background noise which, as explained above, makes the device difficult to use out of doors and in other areas with high background noise. Also, the Silver device is held on the user's head with only a single headband. It has been found that this method of attachment may be insufficient to securely hold the complete portable unit, especially if the user moves about.

Another device is disclosed in U.S. Pat. No. 4,741,030 by Wilson. The Wilson device contemplates a corded or cordless headset with a dial board positioned near the microphone for easy viewing by the user. As in the Silver device, the Wilson device does not disclose the use of two earphones and a volume control to enhance sound quality and to block external noise. Another cordless telephone headset using only a single earphone is disclosed in U.S. Pat. No. 4,484,029 by Kenney.

Other devices exist for communication headsets, but they are not portable cordless telephones. Examples of such devices are in U.S. Pat. No. 4,782,527 by Williamson et. al, and U.S. Pat. No. 4,620,068 by Wieder.

SUMMARY OF THE INVENTION

The present invention is a cordless telephone in which the portable unit is totally contained in a headset. The headset includes its own push button key pad and related control buttons, a rechargeable battery and an RF transceiver. In addition, the preferred embodiment of the portable unit has two earphones and a volume control for enhanced and realistic binaural sound and for reducing background noise interference, a microphone flexibly mounted to the headset, and a supplementary head strap for helping to secure the unit to the user's head.

BRIEF DESCRIPTION OF THE DRAWINGS

FIG. 1 shows a perspective view of a preferred embodiment of the present invention.

FIG. 2 shows an elevation view of the invention of FIG. 1, showing the outside of the left housing with the dial pad.

FIG. 3 shows a schematic diagram of the functional units of the invention of FIG. 1.

DETAILED DESCRIPTION OF THE PREFERRED EMBODIMENT

Figure 4:
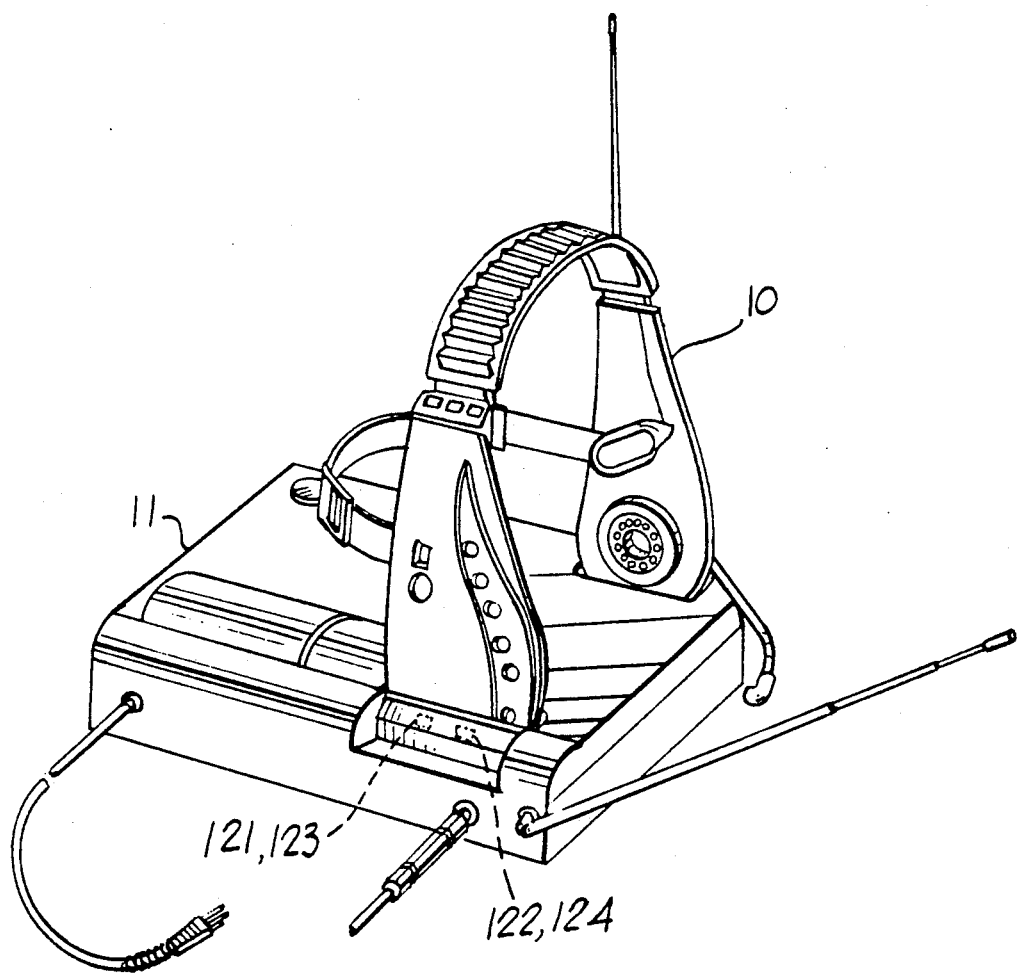
FIG. 4 shows a perspective view of the invention of FIG. 1, engaged with a base station.

A perspective view of the preferred embodiment of the invention is shown in FIG. 1. The device 10 generally includes a left side piece 12, a right side piece 14, a top headband 16 connected to each side piece and a back headband 18 pivotally connected to each side piece 18 with pivot pins 19. The top headband 16 and back headband 18 are each adjustable with a slidable clip 45 and 47, respectively, to accommodate different sized heads. A flexible microphone arm 60 extends from the left side piece 12 to a point adjacent to the user's mouth, and terminates in a microphone 62. An antenna 54 extends from the upper edge of the left side piece 12. An on-off switch 55 is positioned on the bottom edge of the right side piece 14. A battery compartment door 59 is in the bottom of the left side piece 12.

The right side piece 14 includes a set of control buttons. A FLASH button 101 allows the user to simulate disconnecting the line, so that the user can dial another number without actually turning off the unit. A REDIAL button 103 allows the user to dial the last-dialed number, which is automatically stored in the microprocessor unit 105. A PAGE button 107 allows the user to call the base unit in order to operate the portable unit and base unit as an intercom. A PAUSE button 109 functions as a "space" for use in entering codes in which a space is required between entries, as in the case of entering certain bank access codes. A MEMORY button 111 in combination with the keypad numbers allows the entry of up to ten numbers in the microprocessor memory for speed dialing. A multi-indicator light 113 indicates the operation of any of the buttons 101, 103, 107, 109 and 111. The right side piece 14 also has a TALK/STANDBY switch 64 and TALK/STANDBY indicator light 65, the functions of which are described below.

As shown in FIG. 2, the left side piece 12 includes a key pad 50 with the digits "0" through "9" plus "*" and "#". Also on the left side piece 12 is a tone/pulse switch 67 to allow the user to choose tonal or pulse dialing operation of the telephone. The inner side of the left side piece 12 has a volume knob 117 to control the volume of the incoming audio signal, as shown in FIG. 1.

Each of the right side piece 14 and left side piece 12 has an earphone 70 and 72, respectively. The earphones are preferably formed of a resilient rubber or plastic material to securely contact the user's ear and minimize the reception of external background noise. Alternatively, the earphones may be cupped cushions or foam cushions similar to high fidelity earphones (not shown) in order to reduce background noise still further.

The portable unit 10 is used with a base station 11. As shown in FIG. 4, the portable unit 10 is conveniently stored in and engaged with the base station 10 so that battery terminals 121 and 122 contact recharging terminals 123 and 124 in the base station. This causes the batteries to recharge automatically whenever the portable unit is engaged with the base station after use.

A schematic diagram of the functional elements of the portable unit 10 and base station 11 are shown in FIG. 3. The principal components of the portable unit 10 are a transmitter 80 and receiver 82 for transmitting and receiving signals from the base station 11. The portable unit transmitter 80 and receiver 82 are powered by a battery pack 84 and are controlled by a set of control switches 86 and key pad 88. The multi-indicator light 90 is controlled by the control switches 86. The transmitter 80 and receiver 82 are operatively connected to a microphone 62 and to a pair of earphone speakers 94 and 96, and to a portable unit transceiver antenna 97. An amplifier and volume control 99 is in-line with the receiver 82 and speakers 94 and 96.

The base unit includes a base unit transmitter 102 and base unit receiver 104 and a power plug 106 for connection to ordinary household AC current. A recharging unit 108 is provided for recharging the battery pack 84 of the portable unit 10 when not in use. The transmitter and receiver are operatively connected to the telephone line 110 and to a base unit transceiver antenna 112. The battery pack 84 may be in duplicate so that one battery pack can be in use in the portable unit 10 while the other is recharging in the base unit 11 if desired. The recharging can be accomplished with a fast charge/trickle charge unit in a manner well known in the art.

In operation, the device is activated by the TALK/STATION switch 64 in the portable unit 10. In the STANDBY mode the portable unit is activated and will receive calls. In the TALK mode the portable unit is fully functional, and can be used to initiate calls and conduct conversation with both the base station and remote telephones over telephone lines. Activation of the unit turns on the transmitters and receivers of the portable unit 10 and base unit 11. Outgoing calls are initiated by listening for the dial tone transmitted by the base unit transmitter 102 to the portable unit receiver 82 which is heard in the earphone speakers 94 and 96. Upon confirming the existence of the dialtone, a telephone number can be dialed with the key pad 88. As each number or symbol is dialed, it is transmitted from the portable unit transmitter 80 to the base unit receiver 104 and from there into the telephone line 110. The ring tone as the call is connected is transmitted back from the base unit transmitter 102 to the portable unit receiver 82 and to the earphone speakers 94 and 96, and the subsequent conversation proceeds in the normal manner by transmission between the portable unit 10 and base unit 11.

The presence of both earphones greatly reduces the audibility of background noise. Heretofore, most telephone headsets have avoided the use of two earphones, because the headsets have been intended for use by office receptionists or others who have a need to hear conversation external to the telephone. Thus, the use of two earphones is an important departure and results in a binaural sound that is a dramatic improvement in sound quality. It has been found, for example, that the use of two earphones improves audio quality and eliminates the direction of the sound and creates the impression that the communication is inside the user's head. In addition, the use of the volume control allows the user to adjust the volume with regard to various operating environments and background noise levels which, in combination with the two earphones, greatly improves performance of the unit.

When the portable unit is not in use, it can be replaced into the base station in the manner shown in FIG. 4. The left side piece fits into a pocket in the base station so that the external battery pack contacts 121 and 122 contact the recharging terminals 123 and 124, thereby recharging the batteries.

What is claimed is:

1. A portable cordless telephone headset for use with a base station operatively connected to a telephone line and including a base station transceiver and base station antenna, the portable cordless telephone headset comprising:
   (a) a curved housing for attachment to the user's head;
   (b) an RF transceiver including a receiver and a transmitter, in tune with the base station RF transceiver, and contained within said housing, for transmitting and receiving signals to and from the base station;
   (c) an RF antenna connected to said RF transceiver and attached to and extending outside of said housing;
   (d) control means contained within said housing and operatively connected to said RF transceiver for controlling said RF transceiver;
   (e) power means contained within said housing and operatively connected to said RF transceiver for powering said RF transmitter;
   (f) a microphone attached to said housing and operatively connected to said transmitter;
   (g) an amplifier contained within said housing and operatively connected to said receiver for amplifying the signal received by the receiver;
   (h) a volume control means operatively connected to said amplifier for controlling the amplification of the signal received by the receiver;
   (i) a left earphone attached to said housing in a position whereby said left earphone at least partially covers the user's left ear to reduce the audibility of noise external to the headset;
   (j) a left speaker contained in said left earphone and operatively connected to said amplifier;
   (k) a right earphone attached to said housing in a position whereby said right earphone at least partially covers the user's right ear to reduce the audibility of noise external to the headset; and (l) a right speaker contained in said right earphone and operatively connected to said amplifier wherein said housing includes a left housing and a separate right housing, and further comprising:

a curved top headband to extend over the top of the user's head, the left end of the top head band being attached to the left housing and the right end of the top headband being attached to the right housing, said top headband including adjusting means to adjust the length of the top headband to fit the user's head size; and a curved back headband to extend around the back of the user's head, said back headband including adjusting means to adjust the length of the back headband to fit the user's head size;

left back headband pivotal attached means to pivotally attach the left end of said back headband to said left housing; and right back headband pivotal attachment means to pivotally attach the right end of said back headband to said right housing.

* * * * *